United States Patent
Van Willigen

(10) Patent No.: US 7,386,879 B1
(45) Date of Patent: Jun. 10, 2008

(54) BROADCAST NETWORK WITH INTERACTIVE SERVICES

(75) Inventor: Engelbertus Van Willigen, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/427,819

(22) Filed: Oct. 27, 1999

(30) Foreign Application Priority Data

Oct. 27, 1998 (EP) ................... 98203638

(51) Int. Cl.
- *H04L 9/32* (2006.01)
- *H04N 7/173* (2006.01)
- *G06F 15/16* (2006.01)

(52) U.S. Cl. ............ 726/4; 370/486; 709/229; 709/244; 725/93; 725/116; 725/146

(58) Field of Classification Search .......... 713/163, 713/201; 370/486, 352; 726/4
See application file for complete search history.

(56) References Cited

U.S. PATENT DOCUMENTS

| | | | | |
|---|---|---|---|---|
| 5,195,092 A | * | 3/1993 | Wilson et al. ............... | 725/146 |
| 5,946,322 A | * | 8/1999 | Moura et al. ................ | 370/468 |
| 5,973,684 A | * | 10/1999 | Brooks et al. .............. | 715/716 |
| 6,105,134 A | * | 8/2000 | Pinder et al. ............... | 713/170 |
| 6,130,898 A | * | 10/2000 | Kostreski et al. ........... | 370/522 |
| 6,151,628 A | * | 11/2000 | Xu et al. ..................... | 713/201 |
| 6,272,150 B1 | * | 8/2001 | Hrastar et al. .............. | 370/486 |
| 6,314,573 B1 | * | 11/2001 | Gordon et al. ................ | 725/61 |
| 2003/0039237 A1 | * | 2/2003 | Forslow ....................... | 370/352 |

FOREIGN PATENT DOCUMENTS

WO     WO9747106     12/1997

OTHER PUBLICATIONS

"Digital Video Broadcasting (DVB); Network-Independent protocols for DVB Interactive Services", ETS 300802, EBU/CENELEC/ETSI-JTC, Nov. 1997.

* cited by examiner

*Primary Examiner*—Gilberto Barrón, Jr.
*Assistant Examiner*—A. Nobahar

(57) ABSTRACT

In an interactive broadcast system signals transmitted by a service provider (30) are passed via a gateway (12) to a subscriber terminal (2). In order to gain access to services, the subscriber terminal (2) transmits an authorization request message via the gateway (12) to the RADIUS server (18). This RADIUS server (18) transmits in response to the authorization request message an authorization challenge message to the subscriber terminal (2). In return the subscriber terminal responds to the challenge message with a challenge response. This challenge response is checked by the RADIUS server (18) and if correct, the RADIUS server (18) transmits a message to the gateway to give the subscriber terminal access to the service.

6 Claims, 4 Drawing Sheets

BROADCAST NETWORK WITH INTERACTIVE SERVICES

The present invention relates to a broadcast network comprising an information server coupled to a plurality of subscriber stations for transmitting broadcast signals to the subscriber stations, the broadcast network further comprises a return channel for transmitting information from the subscriber terminal to an head-end, the broadcast network further comprises authentication means for authorizing the access of the subscriber terminal to interactive services The present invention also relates to a subscriber terminal, a gateway and a method.

A broadcast network according to the preamble is known from ETS 300802, Digital Video Broadcasting (DVB); Network independent protocols for DVB interactive services, EBU/CENELEC/ETSI-JTC, November 1997.

Presently, interactive services are introduced in several types of broadcast networks, such as DVB-Satellite, DVB-Cable and DVB-Terrestrial. For enabling these interactive services, a return channel has introduced in order to transmit information from a subscriber terminal to a head-end. The information server can be present in the head end, but it may also a remote server which is connected to the head-end. The subscriber terminal can e.g. be a set top box or a cable modem. The return channel can be a connection via the Public Switched telephone Network, via a Cable return channel or even a satellite return channel.

An operator of the information server requires reliable authentication, authorization and subsequent billing of users using the information server. In present systems this authorization is done using the Point to Point Protocol (PPP) which is described in RFC 1661 and RFC 1994. PPP is not suitable for providing for authentication and authorization for different services, because PPP only provides for authentication and authorization of a communication link.

SUMMARY OF THE INVENTION

The object of the present invention is to provide a broadcast network according to the preamble in which authorization and authentication for multiple services is possible. To achieve said objective, the broadcast network according to the present invention is characterized in that the subscriber terminal comprises authorization transmitting means for transmitting authorization request messages to an authorization server, the authorization server being arranged for checking the entitlement of the subscriber to services to be provided by the information server, and in that the authorization server is arranged for enabling the subscriber to access said services.

By introducing the authorization transmitting means in the subscriber terminal and adding authorization server to which request messages can be sent. The authentication server then requests an authentication message from the subscriber terminal. After the identity of the subscriber and the entitlement to the requested service has been verified, the authorization server enables the use of said services by said subscriber terminal. The above process can be carried out for each different service.

It is observed that in RFC 2138 the so-called radius protocol is disclosed. In this protocol, the authorization transmitting means are not included in the subscriber terminal, but they are present in the server to which a subscriber logs on for accessing the service.

An embodiment of the present invention is characterized in that that the information server is coupled to the subscriber terminals via a gateway, and in that the authorization server is arranged for enabling the subscriber to access said services by transmitting a message to the gateway to grant said subscriber access to said services.

An easy way of enabling access to the services is to sent a command message to a gateway informing the gateway that certain services for the authorized subscriber stations have to be passed. This gateway can be present in the head end.

A further embodiment of the invention is characterized in that said message comprises information about at least one source IP address from which IP packets are passed to the subscriber station.

A suitable way to enable services is to inform the gateway that IP packets having a particular destination address have to be passed to the subscriber terminal which has requested. In some systems it will also be needed that IP packets from the subscriber terminal is passed to a host with a particular destination address. This destination address may be the same as the source address, but this is not a necessity.

BRIEF DESCRIPTION OF THE DRAWINGS

The present invention will now be explained with reference to the drawings.

DETAILED DESCRIPTION OF THE PREFERRED EMBODIMENTS

Figure 1:
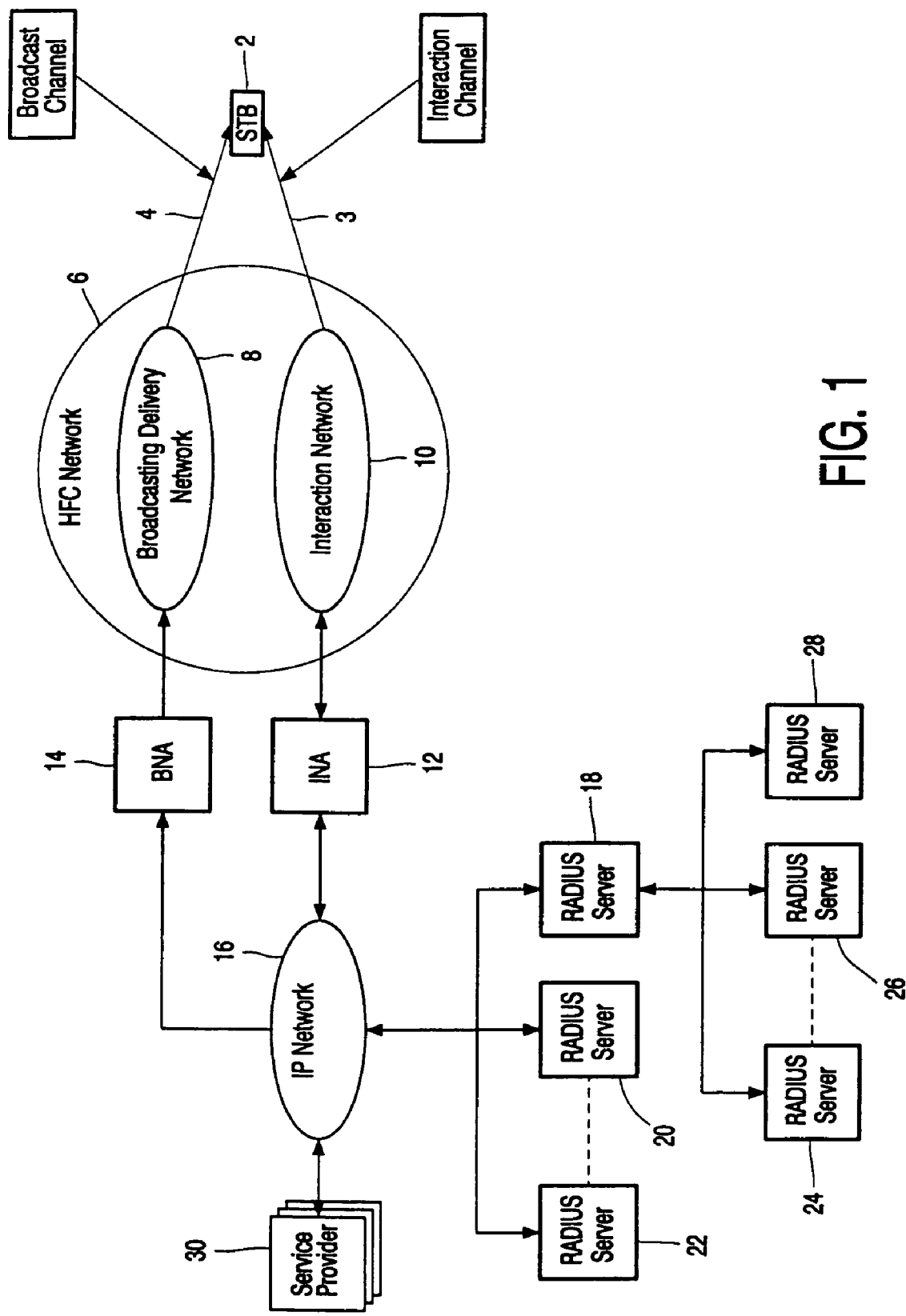
FIG. 1 shows a block diagram of the communication network according to the invention.

In the broadcast network according to FIG. 1, a subscriber terminal 2, which can be a set top box (STB) or a cable modem, is connected via two logical channels 3 and 4 of a Hybrid Fiber Coax network to a gateway 14 (Broadcast Network adapter) and to a gateway 12 (Interaction Network Adapter).

The first logical channel is an unidirectional broadcast channel, which is part of a Broadcasting Delivery Network 8, carries video, audio and data. The second logical channel is a bi-directional interaction channel, which is part of an Interaction Network 10 This second logical channel is intended for interaction purposes. It is formed by a return interaction path and a forward interaction path. The forward interaction path maybe embedded into the broadcast channel. It is possible that the forward path of the interaction channel is not required in some simple implementations that make only use of the broadcast channel for carrying data. Physically, the broadcasting delivery network and interaction network are laid over one HFC network i.e. the STB has one RF connection to the HFC network.

The Interaction Network Adapter (INA) 12 implements the functionality of a Network Access Server (NAS) for allowing the subscriber terminal 12 (STB or Cable Modem) to access an IP network 16 over the HFC network 8. It embeds the interactive (IP) data in the interaction channel 3. The Broadcast Network Adapter (BNA) 14 embeds the (IP) data in the broadcast channel 4.

According to the present invention authorization servers 18, 20 and 22 are connected to the IP network 16. These authorization servers will further to be referred to as RADIUS servers, because they operate according to the RADIUS protocol (RFC 2138). The subscriber terminal 2 transmits an authorization request message via the INA 12 to one of the RADIUS servers 18, 20 and 22. These RADIUS servers transmit an access challenge message to the subscriber terminal 2 in order to check the identity of the subscriber terminal. In response to said access challenge message, the subscriber terminal 2 transmits a second access request message which carries a response to the challenge message to authenticate itself. If the information carried by the second access request message is regarded as correct, the RADIUS server submits configuration information to the INA (or BNA) necessary to deliver the service to the STB in question.

Optionally, a RADIUS server can act as a proxy client to other RADIUS servers or other kinds of authentication servers. This can be seen in FIG. 1, by the connection of further radius servers 24, 26 and 26 to the radius server 18.

As explained above, authentication, authorization and accounting is based on the RADIUS protocol as this is the standard for authentication, authorization and accounting within the Internet community. RADIUS supports authentication, authorization and accounting on a per session basis. Furthermore different applications running in parallel are supported, because each application can initiate the transmission of transmission of request messages to a RADIUS server. Also different accounting policies e.g. one for web-browsing and another for IP-telephony can be supported, because the RADIUS server can transmit different configuration messages to the INA 12 and/or BNA 14.

Due to the present of different RADIUS servers, it is possible that each ISP or ASP does its own authentication, authorization and accounting.

The architecture shall allow STB's which doesn't contain functionality for this architecture to enter the cable network. However, security measures shall be taken that they can not access (accountable) services for which they have to be authenticated and authorized. The architecture is secure i.e. users can not circumvent authentication, authorization and accounting e.g. by 'hacking' the STB or cable modem, because all sensitive information can be stored on a secure smart card.

The proposal is to add RADIUS functionality to the Set-Top-Box and Cable Modem i.e. it looks like a RADIUS client is built into the STB or CM. This can be done by adding RADIUS functionality to the STB and CM middle ware.

The STB RADIUS client present in the subscriber terminal 2, communicates with a RADIUS proxy inside the INA 12 which on its turn communicates with the RADIUS server 18, 20 or 22 of the ISP or ASP in question. The INA 12 includes an IP filter and functionality for accounting.

The subscriber terminal 2 uses a SmartCard which contains for each user an ID, password and a CHAP secrecy. At set-up of the connection, this information is used to authenticate and authorize the subscriber terminal 2 by the RADIUS server 18, 20 or 22.

The INA 12 contains a RADIUS security module for securing the connection with the RADIUS server. The RADIUS security module is used to add to each RADIUS message a cryptographic message digest of the payload of the message, so that the RADIUS server 18, 20 or 22 can verify that the message is generated by an authorized INA and not tampered with.

The data base of the RADIUS server contains for each subscriber terminal, the ID, password and CHAP security data stored on the SmartCard. Furthermore, it contains for each INA the RADIUS security data for authenticating the RADIUS messages coming from the INA in question and vice versa.

The RADIUS client inside the STB implements all necessary functionality for RADIUS authentication, authorization and accounting. It is capable of generating and handling all RADIUS messages i.e. Access-Request, Access-Accept, Access-Reject, Access-Challenge and the accounting messages: Accounting-Request and Accounting-Response plus the necessary message attributes.

RADIUS messages will only be exchanged on the Interaction Channel between the STB and INA.

The subscriber terminal 2 knows the IP address of the RADIUS server, it needs for authorization, authentication and accounting. If this is not the case, the STB uses the IP broadcast address: 255.255.255.255 and the RADIUS proxy of the INA 12 fills in the IP address of the default RADIUS server. (RADIUS uses the well known UDP port number 1812 for RADIUS authentication and authorization and 1813 for RADIUS accounting.) The RADIUS message attribute: 'NAS-Port' can be used to address the different applications running in the subscriber terminal 2.

The RADIUS message attribute: 'NAS-IP-Address' is used to inform the designated RADIUS server of the IP address of the RADIUS client present in the subscriber terminal 2.

Figure 2:
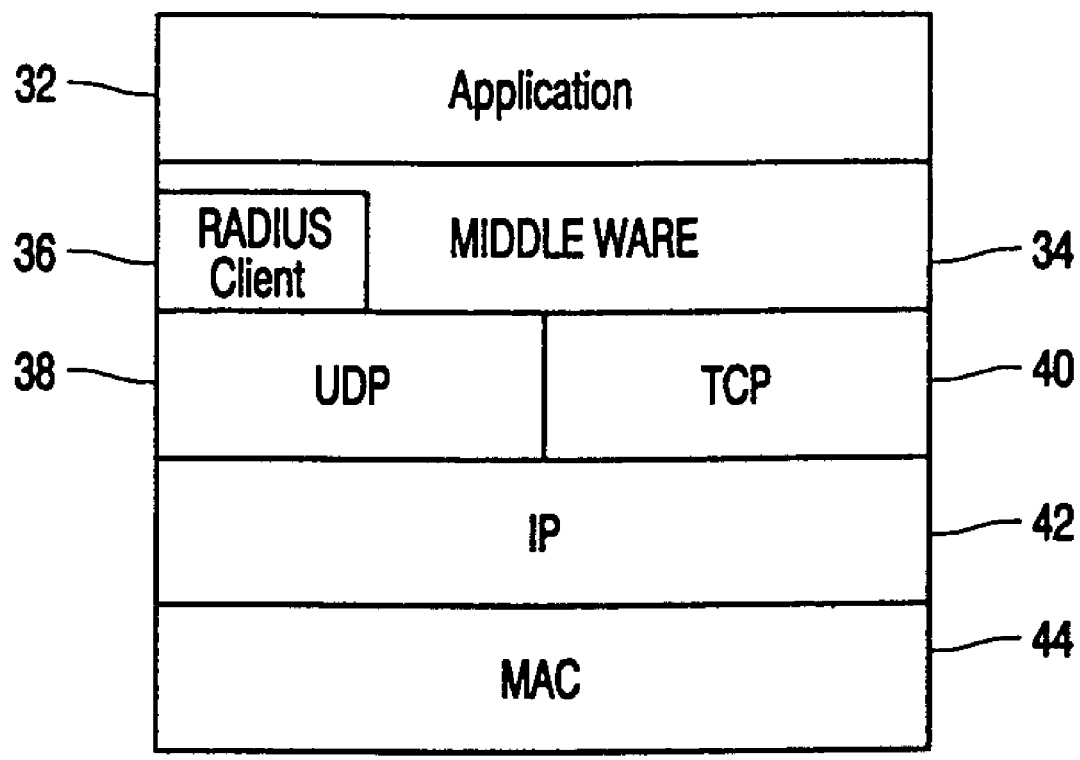
FIG. 2 shows a protocol stack to be used in a subscriber terminal according to the invention.

FIG. 2 shows the protocol stack to be implemented in the subscriber terminal 2. Below the application layer 32, the RADIUS client layer 36 is present. This RADIUS layer is placed on top of the UDP/TCP layers 38 and 40. It can be part of e.g. a MediaHighWay adaptation layer 34. More than one application in the subscriber terminal 2 can make use of the RADIUS functionality, so that for each application a RADIUS session can be executed i.e. authentication, authorization and accounting can be done. Below the TCP or UDP layer, the IP layer and the MAC layer are present.

Figure 3:
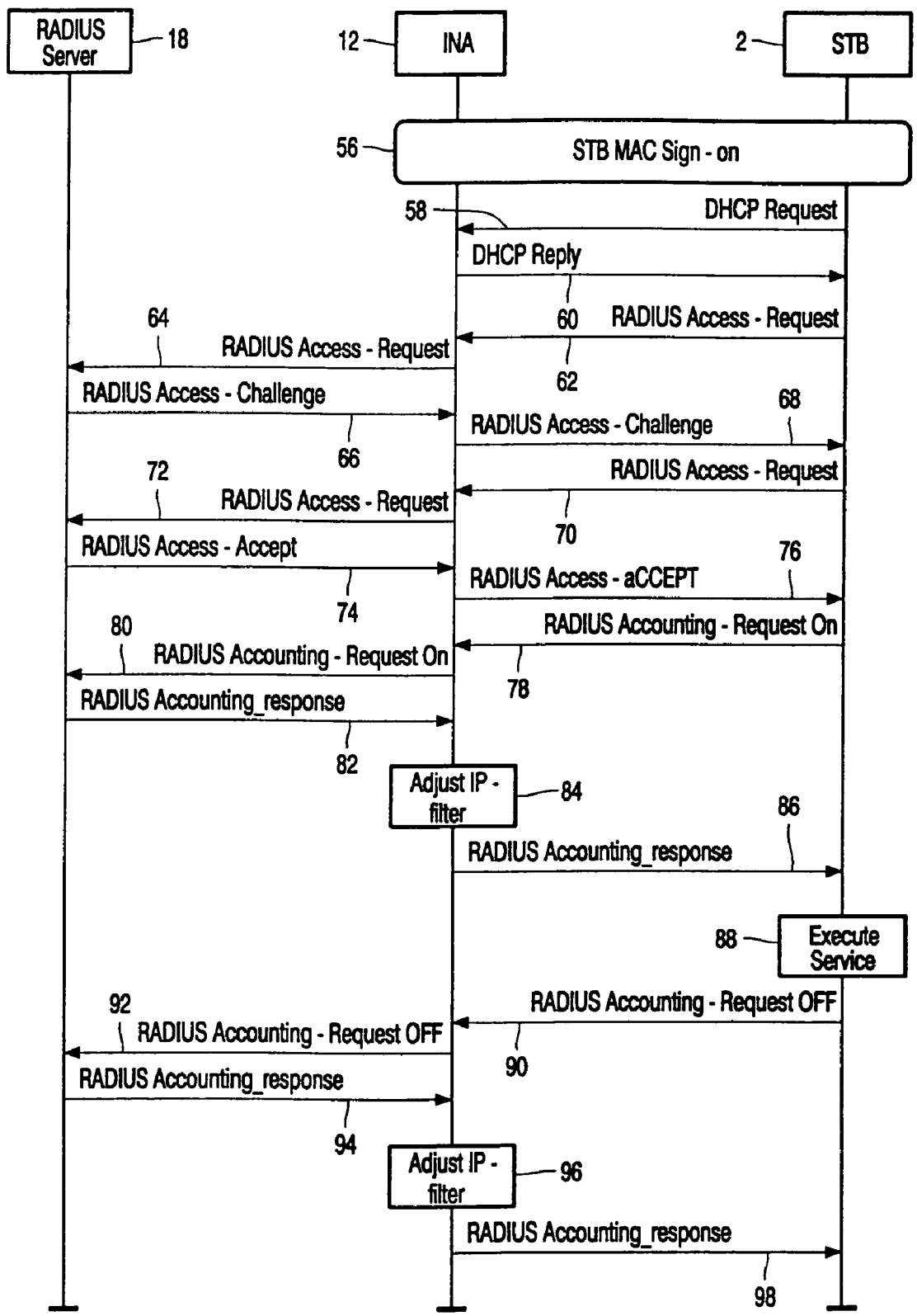
FIG. 3 show a flow diagram of a successful attempt of a subscriber terminal to access services provided by the information server 30.

In the flowgraph according to FIG. 3, the interactions, needed for authenticating, authorizing and accounting, between the subscriber terminal 2, the INA 12, the RADIUS server are shown.

This sequence is executed after a STB has successfully signed-on, on the MAC layer in step 56. In step 58 the subscriber terminal 2 sends a DHCP request message to the INA 12 in order to obtain an IP address. In step 60, the INA 12 replies by transmitting DHCP reply message containing an IP address to be used by the subscriber terminal 2.

In order to access a service, the subscriber terminal 2 sends a RADIUS access request message to the INA 12 in step 62. In step 64 the INA 12 forwards this request message to the appropriate RADIUS server e.g. 18. In response to said RADIUS access request message, the RADIUS server transmits in step 66 a RADIUS challenge message to the INA 12, which passes this message in step 68 to the subscriber terminal 2 to authenticate it. The subscriber terminal 2 replies in step 70 with transmitting (via the INA 12, step 72) a RADIUS access request message containing the RADIUS challenge response to the RADIUS server 18.

The RADIUS server 18 checks the challenge response message and if the challenge response is correct, the RADIUS server 18 replies in step 74 with a RADIUS access accept message. This RADIUS access accept message signals the INA 12 and, in step 76, the subscriber terminal 2 that this subscriber terminal 2 is given access to the requested service.

Before the requested service is started, the subscriber terminal 2 sends in steps 78 and 80 a RADIUS accounting request message via the INA 12 to the RADIUS server 18 in order to turn on the accounting for the requested service. The RADIUS server 18 will respond in step 82 by transmitting a RADIUS accounting response message to the INA 12. This message will adjust the IP-filter 84 of the INA 12 in such way that the IP-datagrams of the requested service can be forwarded by the INA 12 to the subscriber terminal. Furthermore, the INA 12 forwards the RADIUS accounting response message to the subscriber terminal 2. In response to the RADIUS accounting response message, the subscriber terminal 2 starts the service.

When the requested service has finished, the subscriber terminal 2 transmits in steps 90 and 92 a RADIUS accounting request message to turn off accounting, via the INA 12 to the RADIUS server 18. The RADIUS server 18 responds to the message 92 with an RADIUS accounting response 94 which is transmitted to the INA 12 and which is passed as message 98 to the subscriber terminal. When the RADIUS accounting response is received by the INA 12 from the RADIUS server 12, the IP-filter is adjusted in such way that the IP datagrams of the service in question is blocked by the INA.

It is observed that the above is only an example of how the interaction between the STB, INA and RADIUS server can be done. Many variations can be introduced on this sequence.

Figure 4:
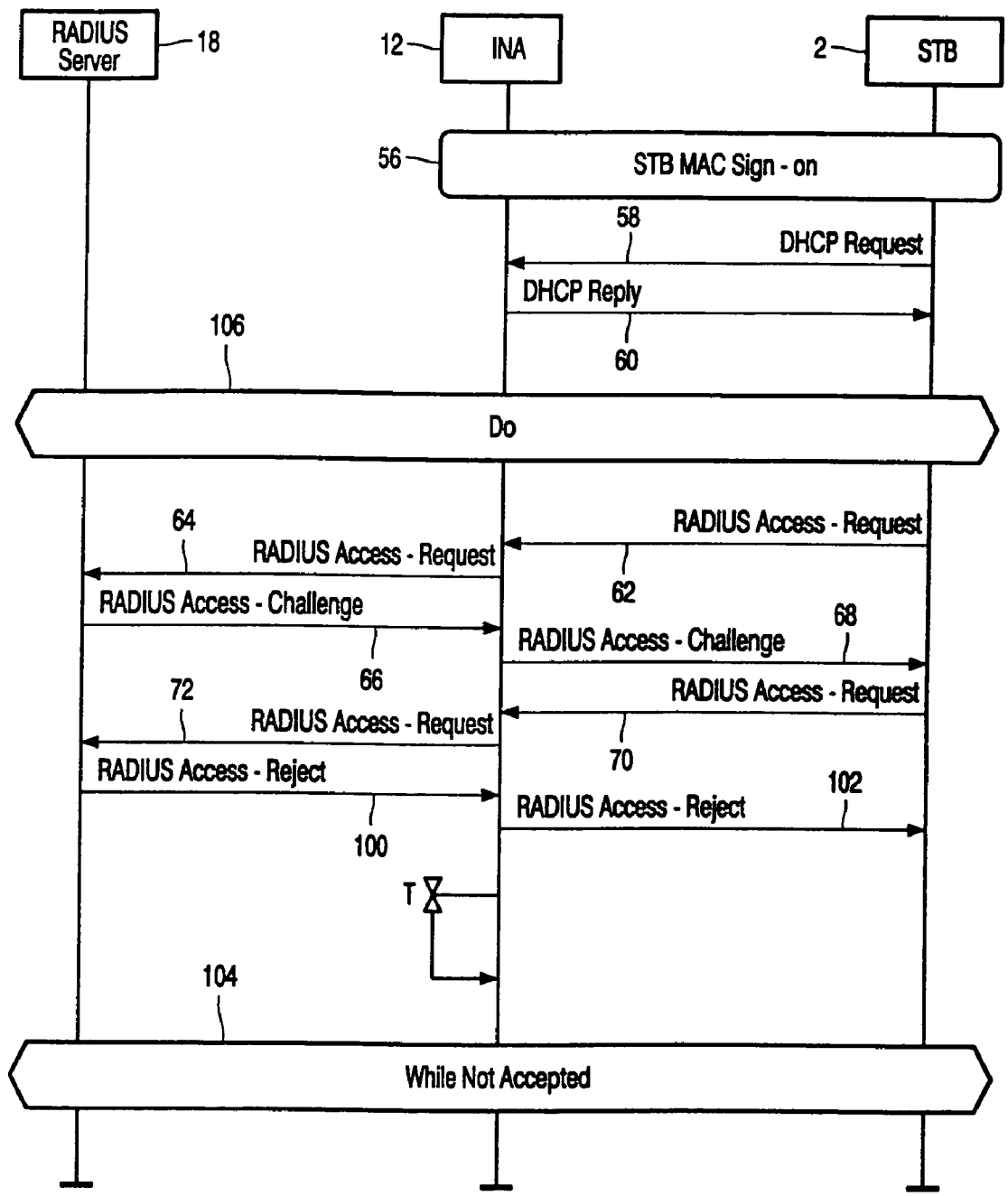
FIG. 4 show a flow diagram of a failing attempt of a subscriber terminal to access services provided by the information server 30.

The flowgraph according to FIG. 4 shows the interactions between the subscriber terminal 2, the INA 12 and the RADIUS server 18 for the case that the subscriber terminal 2 is rejected:

The steps up to and including step 72 are exactly the same as is shown in FIG. 3. When the challenge response transmitted by the subscriber terminal is not correct, the RADIUS server replies with a RADIUS access reject message 100 which is transmitted to the INA 12 and passed to the subscriber terminal 2 to signal the INA 12 and the subscriber terminal 2 is not allowed to access the service.

After some time the subscriber terminal 2 to enter the network again. This can be handy for the case that the access permissions of the STB has changed in the meantime. For example, the user has called the service center of the access service provider to update its permissions. This repeated re-tries are indicated in FIG. 4 by the "Do" and "While Not Accepted" blocks 106 and 104. As long as access of the subscriber terminal 2 is not authorized, The IP-filter inside the INA will block passing information from the information provider 30 to the subscriber terminal 2. Also passing of information from the subscriber terminal 2 to the information provider 30 is blocked.

With PPP, only the PPP 'pipe' (i.e. connection) is authenticated and authorized. Furthermore, the accounting used in PPP is the same for all types of services i.e. it can not support different accounting policies for different services. In the direct-IP architecture, the authentication, authorization and accounting can be done on a per service basis.

By using an IP-filter and by doing accounting outside the STB, the proposed architecture is expected to be secure i.e. users can not circumvent authentication, authorization and accounting by using an 'phony' STB. The IP-filter will keep out data of unauthorized STB's. The IP-filter will be controlled by the RADIUS messages from the RADIUS server in question.

The proposed architecture can support homogeneous networks with cable modems and STB's from third parties. It is observed that that the proposed architecture also works with PPP

| Acronyms | |
|---|---|
| ASP | Access Service Provider. |
| BNA | Broadcast Network Adapter. |
| CM | Cable Modem. |
| CRC | Cable Return Channel. |
| DVS | Digital Video Systems. |
| HFC | Hybrid Fiber Coax. |
| INA | Interactive Network Adapter. |
| IP | Internet Protocol. |
| ISP | Internet Service Provider. |
| MAC | Medium Access Control |
| RADIUS | Remote Authentication Dial In User Service. |
| RF | Radio Frequency. |
| STB | Set Top Box. |
| TCP | Transfer Control Protocol |
| UDP | User Datagram Protocol. |

The invention claimed is:

1. A Broadcast network comprising:
an information server coupled to an internet protocol gateway;
a plurality of subscriber terminals coupled to the internet protocol gateway, the subscriber terminals for receiving broadcast signals from the information server;
a return channel for transmitting information from a subscriber terminal to a head-end;
wherein the subscriber terminal is configured to enable a subscriber to request, from an authorization server using an internet protocol gateway, one or more of a plurality of services, the authorization server configured to check the entitlement of the subscriber to the one or more of a plurality of services to be provided by the information server, and the authorization server is configured to enable the subscriber to access said one or more plurality of services, wherein each requested service can be authorized separately.

2. The Broadcast network according to claim 1, wherein said services are transmitted using IP packets, and in that said request comprises information about at least one destination IP address to which IP packets from the subscriber station are passed.

3. A Subscriber station for receiving broadcast signals, said subscriber stations being arranged for transmitting information via a return channel to a head-end, wherein the subscriber station is configured to enable a subscriber to logon and transmit an authorization request message to an authorization server, the subscriber station further being arranged for receiving authorization messages from the authorization server, and in that the subscriber station is arranged for requesting services from the head-end after receiving a positive authorization message, wherein each requested service can be authorized separately.

4. A gateway for passing information from an information server to at least one subscriber terminal, wherein the gateway is arranged for requesting one or more of a plurality of services to an authorization server using a protocol network, and in that the gateway is arranged for enabling the subscriber to access the one or more of a plurality of services in response to an authorization message received from the authorization server, wherein each requested service can be authorized separately.

5. A method comprising transmitting broadcast signals to at least one subscriber station and transmitting information from the subscriber terminal to an head-end, the method comprising the steps of:

authorizing the access of the subscriber terminal to available services, wherein a subscriber terminal is configured to send a request to an authorization server for one or more of a plurality of services to the authorization server;

checking, by the authorization service using an internet protocol gateway, the entitlement of the subscriber terminal to the one or more of a plurality of services to be provided; and enabling the subscriber to access said one or more of the plurality of services by transmitting a message to the gateway to grant said subscriber access to said services.

6. The Method according to claim 5, wherein said message comprises information about at least one source IP address from which IP packets are passed to the subscribes station.

* * * * *